Campbell & Woodward,
Wire Peg.
No. 110,431.        Patented Dec. 27, 1870.
— Fig. 1. —
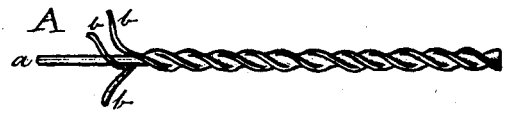
— Fig. 2. —
— Fig. 3. —
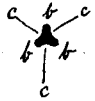
— Witnesses: —
Alban Andrén
H. S. Torrey
— Inventors: —
Duncan H. Campbell
Erastus Woodward

United States Patent Office.

DUNCAN H. CAMPBELL, OF SUNDERLAND, SCOTLAND, AND ERASTUS WOODWARD, OF CHARLESTOWN, MASSACHUSETTS.

Letters Patent No. 110,431, dated December 27, 1870.

IMPROVEMENT IN WIRES FOR MAKING PEGS FOR BOOTS AND SHOES.

The Schedule referred to in these Letters Patent and making part of the same.

We, DUNCAN H. CAMPBELL, of Sunderland, Scotland, and ERASTUS WOODWARD, of Charlestown, in the county of Middlesex and State of Massachusetts, have jointly invented a new and useful Improvement in Wire Pegs for Boots and Shoes, of which the following is a specification.

Nature and Objects of our Invention.

The nature of our invention relates to a new construction of wire pegs, consisting of one central wire, around which is twisted one or more wires, that afterward are affixed to the central one by means of some soft or hard solder, or alloy, as herein now will be fully shown and explained.

On the drawing—

Figure 1 is an enlarged view of our cable-wire, where the end A is split so as to show the arrangement of the central wire $a$, surrounded by the wires $b\,b\,b$, that form the complex screw around the central wire $a$;

Figure 2 is a cross section of the cable-peg before the solder or alloy is affixed thereto; and Figure 3 is a similar section when the cable-peg is complete, united by means of the solder or alloy, as before named.

We construct our improved wire peg as follows:

We take a common metallic wire, $a$, and by means of suitable machinery we twist around the said central wire $a$ one or more wires, $b\,b\,b$, which latter thus form a screw or helix, of any desirable pitch, around the wire $a$.

When the central wire $a$ is spun with one or more wires, $b\,b\,b$, we pass the whole through a melted soft or hard solder, or alloy, that will unite the different parts to a solid mass of a section, as fully shown on fig. 3.

The top of the screw thus formed is of a half-circular shape, of a diameter equal to that of the wires $b\,b\,b$, and the bottom of said screw is formed of the solder or alloy that unites the central wire with the surrounding ones, and is of a rounded shape, as shown at $c\,c\,c$, fig. 3.

The object of thus constructing our wire peg is to obtain more elasticity than what has heretofore been obtained with wire pegs, and also from preventing the moisture in the leather of a boot or shoe to rust the peg, whereby the boot is speedily disarranged, as the coating of the solder or alloy is of such a nature as not to be affected by the action of moisture or the atmosphere.

We are also able to use an inferior kind of iron or metal than what is commonly used for this purpose, and we obtain a stronger and more elastic peg than others now used.

We make our improved elastic peg as a continuous cable, which afterward is to be used in pegging-machines, or cut up in separate pegs, to be inserted by hand in the soles of boots or shoes.

Having thus described the nature and operation of our invention,

We wish to secure by Letters Patent and claim—

As a new article of manufacture, a wire cable, of continous size throughout, for attaching the soles to boots and shoes, formed from one central wire, $a$, or a column of wires, surrounded by one or more wires, $b\,b\,b$, of any desirable pitch, and united together by means of a solder or alloy, for the purpose as herein fully set forth and described.

DUNCAN H. CAMPBELL.
ERASTUS WOODWARD.

Witnesses:
ALBAN ANDREW,
H. S. PORREY.